United States Patent [19]

Jacobson

[11] 4,130,052
[45] Dec. 19, 1978

[54] COMBINATION SMOKER-COOKER FOR FOOD

[76] Inventor: John E. Jacobson, 11 Northwestern Dr., Topeka, Kans. 66619

[21] Appl. No.: 671,843

[22] Filed: Mar. 30, 1976

[51] Int. Cl.² ............................ A23L 1/00; A23B 4/04
[52] U.S. Cl. ........................................ 99/339; 99/467; 99/482; 219/405
[58] Field of Search ................................. 99/467–468, 99/482, 421 P, 339–340, 357; 426/314–315, 526, 281; 34/15; 432/205; 126/273 R; 219/405, 408, 391, 393, 412–413

[56] References Cited

U.S. PATENT DOCUMENTS

| 2,179,646 | 11/1939 | Spartalis | 99/421 P |
| 2,333,505 | 11/1943 | Allen | 426/314 |
| 2,338,156 | 1/1944 | Allen | 426/314 |
| 2,591,213 | 4/1952 | Stupin | 99/467 |
| 2,893,879 | 7/1959 | Huckabee | 426/314 |

Primary Examiner—Harvey C. Hornsby
Assistant Examiner—Robert Pous
Attorney, Agent, or Firm—Lowe, Kokjer, Kircher, Wharton & Bowman

[57] ABSTRACT

The present invention relates to a method and apparatus for smoking foods. An enclosure is presented which is characterized by an absence of any ventilating means. The enclosure is substantially air tight. Hickory or other exotic wood blocks or chips are used as the source of smoke and an electric heating element raises the temperature in the enclosure to approximately 200°–300° F. This activates the wood and produces the desired smoke. The increase in temperature also produces an increase in pressure within the enclosure which in turn causes a pressure differential between the inside and the outside of any food being processed. This forces smoke and wood resins to permeate the meat and enhance the food with the desired smoke flavor. The enclosure in which the food is smoked is also of unique design in that the back wall is presented in three planes so as to avoid forming any right angles with any other sidewalls. Two panels of the back wall extend at an obtuse angle to the third central panel and to the adjacent sidewalls. Also, the food supporting shelves are spaced from the sidewalls a short distance. This provides for maximum circulation of heat and smoke and the absence of 90° angles helps prevent "hot spots" from forming. All of the food supporting structure may be easily removed to facilitate cleaning. To this end, the absence of 90° corners is of substantial benefit in preventing excessive build up of grease, etc. and also makes it easier to remove any foreign matter which does accumulate.

4 Claims, 5 Drawing Figures

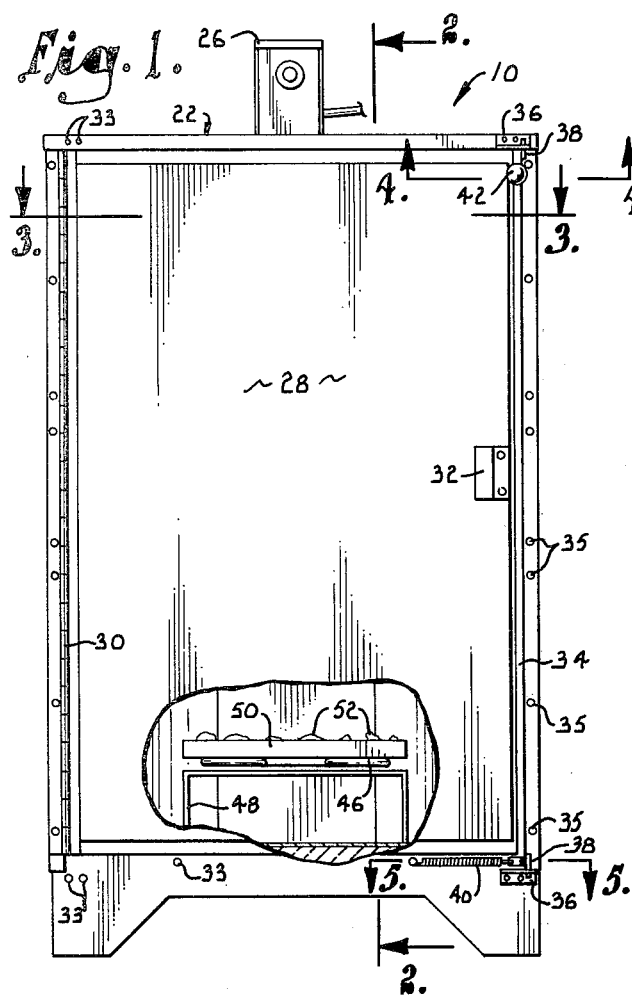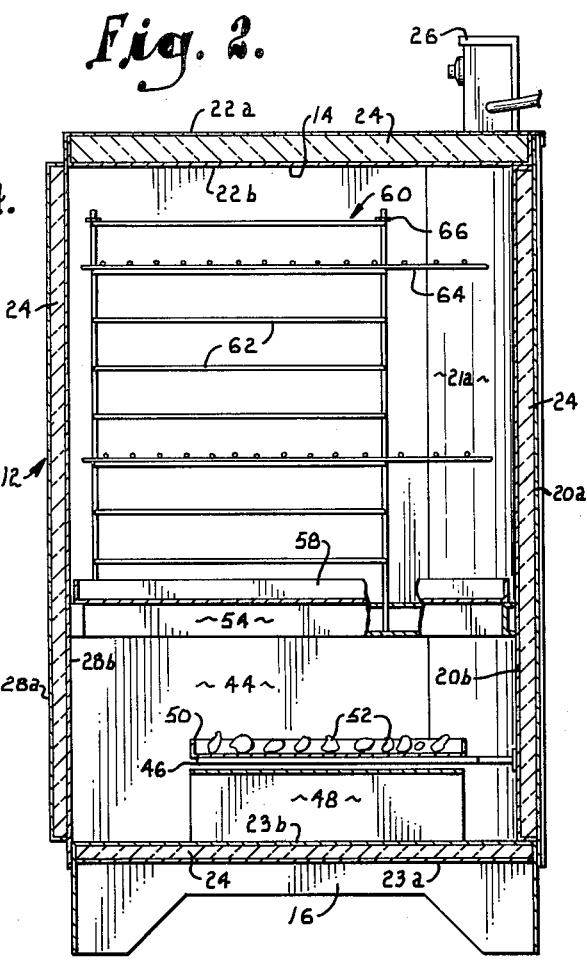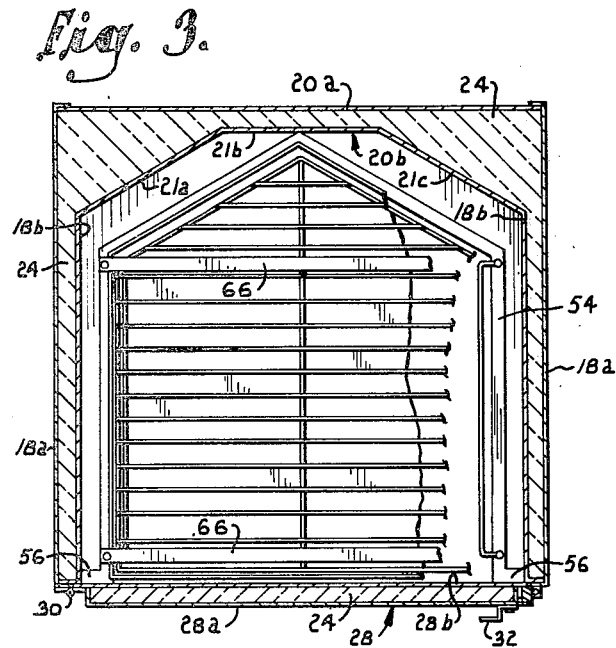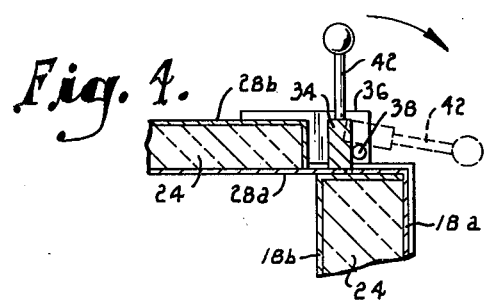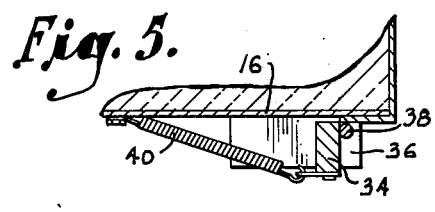

COMBINATION SMOKER-COOKER FOR FOOD

This invention relates to a device for cooking food and imparting to the food a natural wood smoke flavor. The invention also encompasses a method of smoking food.

For many years it has been popular to cook food over a hickory or other wood fire to impart to the food a desirable flavor which is attributable to the smoke of the particular wood. In most instances the wood flavor is obtained only by utilizing an open fire where hickory or other wood is burned. In most recent years wood blocks or chips have been utilized to some extent in order to cut down on the size of installation which is necessary to produce the wood smoke. The wood blocks or chips may be utilized in a smaller area and attempts have even been made to produce ovens in which the blocks or chips can be activated to produce the desired smoke.

A substantial problem with any natural hickory or other wood barbeque is the difficulty in obtaining reproducible results. Even if a particular restaurant consistently obtains good quality smoked food, it is often difficult to repeat this at a different location utilizing different personnel and different equipment. A particular problem is the need to observe cleanliness through thorough, periodic maintenance to avoid build up of grease and food particles which will have an adverse affect on the taste of flavor of the food being cooked or smoked.

It is, therefore, an object of the present invention to provide a method and apparatus for imparting a superior smoke flavor to food which results are highly reproducible from location to location and utilizing different personnel.

As a corollary to the above object, an important aim of the invention is to provide an oven for cooking and smoking food wherein the design of the oven results in utilization of lower temperatures and a superior circulation of heat and smoke thereby resulting in less shrinkage and superior flavored food and attributing to the reproducibility of the results.

Another corollary to the object above is to provide an oven construction which, because of lower cooking temperatures and superior circulation in the oven, minimizes the build up of grease and food particles, thereby minimizing the maintenance problem.

Still another corollary to the above object is to provide an oven construction which avoids 90 degree angles at the back of the oven thereby greatly facilitating periodic cleaning of the oven interior.

Still another important objective of this invention is to provide an oven wherein all interior parts are removable to facilitate the cleaning of the oven and nothing is permanently fastened to any interior surface.

A further aim of this invention is to provide a method and apparatus for smoking food which gives superior smoke flavoring and reduced weight loss or shrinkage as a result of the fact that the enclosure for the food is without ventilation and operates at a lower temperature, thereby causing a pressure increase which forces smoke flavor into the food and lessens dehydration.

As a corollary to the above aim, an objective of the invention is to provide a smoking oven which avoids all ventilation and is substantially air tight, thereby reducing the oxygen content in the oven and minimizing burning of any meat particles or grease which may be present in the oven.

It is also an objective of my invention to provide an oven as described in the above aims and objects which utilizes hickory or other wood blocks or chips, thereby permitting a smaller size unit and affording ease in handling the smoke-producing substance.

Still another aim of the invention is to provide a smoking oven as described in the foregoing aims and objects which makes better utilization of energy to operate the oven as a result of its interior construction which promotes circulation of both heat and smoke throughout the oven while avoiding "hot spots" which could be damaging to the food.

Another one of the objects of my invention is to provide a novel reversible door latch and lock mechanism for a cooking and smoking oven, thereby allowing one model apparatus to be interchangeably either left or right hand door opening.

Other objects of the invention will be made clear or become apparent from the following description and claims when read in light of the accompanying drawing, wherein:

FIG. 1 is an elevational view of a smoking and cooking oven constructed according to the present invention, with a portion of the door being broken away to illustrate the interior;

FIG. 2 is a vertical, cross-sectional view illustrating details of the oven construction and taken along line 2—2 of FIG. 1;

FIG. 3 is a horizontal, cross-sectional view taken along line 3—3 of FIG. 1;

FIG. 4 is an enlarged, vertical, cross-sectional view taken along line 4—4 of FIG. 1; and FIG. 5 is a horizontal, cross-sectional view, also on an enlarged scale, and taken along line 5—5 of FIG. 1.

Referring initially to FIG. 1, the combination smoker-cooking device of the present invention is designated generally by the numeral 10. The device 10 comprises a generally rectangular enclosure 12 having an opening along its front side, which opening is designated by the numeral 14. Enclosure 12 is seated upon a base frame 16 which may be fabricated from sheet metal or any structurally sound material. The enclosure is characterized by a double-walled construction which includes sidewalls 18a and 18b (FIG. 2), a pair of back sidewalls 20a and 20b, a roof formed from inner and outer walls 22a and 22b and a floor formed from outer and inner walls 23a and 23b.

Each pair of walls 18a—18b, 20a—20b, 22a—22b and 23a—23b is separated by a layer of insulating material 24. As will be appreciated from viewing the drawings, the thickness of layer 24 may be varied to accommodate the different configurations of the walls and to provide for increased insulation in the area where heat loss is most critical.

It is to be noted that the inside back sidewall 20b is formed from three generally planar panels 21a, 21b and 21c. Each of these panels forms an obtuse angle with the adjacent panel and, in the case of panels 21a and 21c, also with the adjacent inner sidewall 18b.

Mounted on top of roof wall 22a is a thermostat control designated generally by the numeral 26. Pivotally mounted on enclosure 12 to provide means for closing opening 14 is a door designated generally by the numeral 28. Door 28 is constructed from two door panels 28a and 28b separated by a layer of the insulating material 24. The door is pivotally coupled with one of the sidewalls 18 by a piano hinge 30 and a handle 32 on the opposite side facilitates opening and closing of the door.

A plurality of openings 33 on the left hand side of enclosure 12 and a plurality of openings 35 on the right hand side permit door 28 to be reversed as will be explained more fully hereinafter.

Door 28 may be locked shut through utilization of a locking bar 34. Bar 34 extends the entire length of door 28 and is of generally rectangular, cross-sectional configuration as best illustrated in FIG. 4. Bar 34 is pivotally mounted in brackets 36 by two mounting pins 38 which project from one side of the bar and are rigid with it. A tension spring 40 is disposed at the lower end of bar 34 and biases the bar into its locking position. A handle 42 at the upper end of bar 34 provides means for moving the bar from the locking position shown in solid lines in FIG. 4 to the unlocked position shown in broken lines in the same FIG.

Referring now to the interior of enclosure 12, it is seen that a generally box-like compartment 44 is presented by the enclosure. Mounted near the bottom of compartment 44 is an electrical plug in heating element 46 which is in electrical connection with a receptacle socket. Positioned beneath heating element 46 is a generally U-shaped heat shield 48 which reflects heat energy emanating from element 46 in an upwardly direction. Positioned immediately above element 46 and resting upon the element is a shallow pan 50 which is used to hold a quantity of hickory or other wood blocks or chips 52.

Rigidly mounted above pan 50 is a framework 54 which is disposed in spaced relationship to inner walls 18b, door surface 28b and panels 21a, 21b, and 21c. The framework is supported only at one end by laterally extending ears 56 and at the other end where the V-shaped legs of the framework converge at a point on back panel 21b. This framework then supports a drip pan 58 which catches drippings from food placed in the oven.

Framework 54 also supports a pair of opposed upright members 60 which present a plurality of spaced apart ledges 62 for supporting shelves 64. The two upright members 60 are tied together by flat bars 66 (FIG. 3) which span the distance between the members at both the front and back of the compartment.

In operation, food is placed in the device 10 on racks 64. The desired temperature is selected depending upon whether the food is to be both cooked and smoked or simply smoked after already being fully or partially cooked. An appropriate quantity of desired wood blocks or chips are placed in pan 50 to accomplish the desired smoking and door 28 is closed and locked utilizing locking bar 34. As heating element 46 becomes hot, the temperature in the oven will rise activating the wood to give off the desired smoke as the resins from the wood are vaporized. To accomplish the desired smoking, the temperature in the oven should be raised to approximately 200°-300° F. It is to be noted that enclosure 12 is characterized by an absence of any ventilating means therein. This feature, together with the substantially air tight construction of the enclosure, assures that as the temperature rises there will be an increase in pressure within the compartment 44. This increase in pressure will force the smoke which accumulates in the compartment to permeate the food which is also present. The increased pressure as well as the reduced operating temperature also greatly reduces the dehydration of foods which is associated with more conventional smoking procedures. Greatly superior smoking is achieved over what is accomplished in an open fire or conventional oven maintained at substantially atmospheric pressure. The absence of any ventilating means also reduces the oxygen content of the atmosphere within compartment 44 thereby reducing the possibility of burning drippings or pieces of food which may come in contact or close proximity with heating element 46. This of course is desirable from the standpoint of avoiding the unpleasant odors or flavor alteration associated with burning food and also from the standpoint of keeping the enclosure interior clean.

Another important feature of the enclosure 12 is the interior design whereby all of the food racks 64 as well as drip pan 58 are placed in spaced relationship to the door and sidewalls of the compartment. This provides for maximum circulation of both heat and smoke throughout the compartment. Another feature of the invention is the construction of the inside back sidewall 20b to present the three planar panels 21a, 21b and 21c. With the two end panels 21a and 21c forming obtuse angles with the adjacent sidewalls 18b, any 90° angles at the back of the compartment are eliminated. This helps to eliminate "hot spots" which can occur in a "dead" area such as is presented by a 90° angle and, in so eliminating these hot spots, more reproducible results are obtained with the device 10. The construction of the back sidewall 20b as described also greatly facilitates maintenance of the interior by eliminating the 90° corners where food and grease would accumulate and be difficult to remove.

Still another desirable feature of the device 10 is the fact that the entire food supporting structure including shelves 64 and uprights 60 can quickly and easily be removed for cleaning purposes. Similarly, drip pan 58 as well as pan 50, heating element 46 and reflector 48 can all be removed from compartment 44 when cleaning is necessary.

It is also an advantage of the construction of device 10 that door 28 can easily be changed from a right opening door to a left hand opening door. To this end hinge 30 is removed and secured to the right hand side after the door is rotated 180°. Pre-placed holes 35 readily facilitate this change. Also upper bracket 36 is removed and secured at the lower left hand side while lower bracket 36 is moved to the upper left hand corner. Holes 33 facilitate this change which permits the locking bar 34 to also be moved to the left hand side.

From the foregoing description, it will be apparent that the present invention encompasses a novel method of imparting flavor to foods through the use of any substance capable of producing flavor imparting gases or vapors upon heating and apparatus for accomplishing same which offer many advantages over prior teachings.

Having thus described the invention, I claim:

1. A device for cooking and imparting flavor to foods comprising:
   an enclosure characterized by substantially air tight construction and an absence of any source of outside air,
   said enclosure presenting a substantially box-like compartment having an opening at one side thereof, said compartment being characterized by a sidewall opposite said one side which sidewall does not present any 90° angles with any other sidewalls,
   said enclosure being adapted to receive means for producing flavor imparting gases or vapors upon being heated;

door means pivotally coupled with said enclosure for closing said compartment opening, locking means for said door means comprising an elongated bar extending substantially the length of the door, means for pivotally mounting said bar on said enclosure and handle means for moving said bar from a locking to an unlocking position; and means for raising the temperature in said enclosure to an elevated level high enough to effect cooking of the food while also effecting production of gases or vapors from said flavor producing means and simultaneously increasing the pressure in said enclosure.

2. A device as set forth in claim 1, wherein is included means for holding a quantity of a substance capable of releasing smoke upon heating; and said heating means comprises an electric heating element disposed in closely spaced relationship to said holding means.

3. A device as set forth in claim 2, wherein said heating means is operable to raise the temperature of said enclosure to approximately 200°–300° F.

4. A device as set forth in claim 3, wherein said heating element is disposed beneath said holding means and including heat reflector means disposed beneath said heating element.

* * * * *